United States Patent
Lorenz et al.

(10) Patent No.: US 9,006,499 B2
(45) Date of Patent: Apr. 14, 2015

(54) PROCESS FOR PREPARING POLYETHER POLYOLS

(71) Applicant: Bayer MaterialScience AG, Leverkusen (DE)

(72) Inventors: Klaus Lorenz, Dormagen (DE); Marcus Eichmann, Dusseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 14/178,517

(22) Filed: Feb. 12, 2014

(65) Prior Publication Data

US 2014/0243559 A1 Aug. 28, 2014

(30) Foreign Application Priority Data

Feb. 22, 2013 (EP) ..................... 13156343

(51) Int. Cl.
*C08G 65/34* (2006.01)
*C08G 65/00* (2006.01)
*C08G 65/30* (2006.01)

(52) U.S. Cl.
CPC ............... *C08G 65/34* (2013.01); *C08G 65/00* (2013.01); *C08G 65/30* (2013.01)

(58) Field of Classification Search
USPC ....................................................... 568/867
See application file for complete search history.

(56) References Cited

U.S. PATENT DOCUMENTS

| | | | |
|---|---|---|---|
| 2,902,478 A | 9/1959 | Anderson | |
| 3,085,085 A | 4/1963 | Wismer et al. | |
| 3,190,927 A | 6/1965 | Patton, Jr. et al. | |
| 3,823,145 A | 7/1974 | Louvar et al. | |
| 4,332,936 A | 6/1982 | Nodelman | |
| 4,430,490 A | 2/1984 | Doerge | |
| 4,507,475 A | 3/1985 | Straehle et al. | |
| 4,521,548 A | 6/1985 | Christen et al. | |
| 5,625,045 A | 4/1997 | Gupta et al. | |
| 6,827,858 B2 | 12/2004 | Bader et al. | |
| 7,772,330 B2 * | 8/2010 | Lorenz et al. | 525/438 |
| 8,501,904 B2 | 8/2013 | Lorenz et al. | |
| 2004/0167316 A1 | 8/2004 | Anderson et al. | |
| 2009/0048420 A1 | 2/2009 | Lorenz et al. | |
| 2011/0021738 A1 | 1/2011 | Lorenz et al. | |
| 2012/0184705 A1 | 7/2012 | Lorenz et al. | |

FOREIGN PATENT DOCUMENTS

| | | |
|---|---|---|
| EP | 0693513 B1 | 1/2001 |
| EP | 1751213 B1 | 2/2008 |
| FR | 1285708 A | 2/1962 |
| JP | 06157743 A | 6/1994 |
| RO | 118433 B1 | 5/2003 |
| WO | 9620972 | 7/1996 |
| WO | 9820061 A1 | 5/1998 |
| WO | 0114456 A1 | 3/2001 |

OTHER PUBLICATIONS

Database CAPLUS on STN, Acc. No. 1976:463982, Carroll et al., DE 2549449 A1 (May 13, 1976) (abstract).*
M. Ionescu, et al. in "Advances in Urethanes Science and Technology", 1998, 14, p. 151-218.
Handbuch Apparate [Apparatus Handbook]; Vulkan-Verlag Essen, 1st ed. (1990), p. 188-208.

* cited by examiner

Primary Examiner — Brian J Davis
(74) Attorney, Agent, or Firm — Donald R. Palladino; Robert S. Klemz

(57) ABSTRACT

The present invention relates to a process for preparing polyether polyols by base-catalyzed addition of alkylene oxides (epoxides) onto starter compounds which are solid at room temperature and have Zerevitinov-active hydrogen atoms, a particular feature of which is that visually clear and/or homogeneous products are obtained even in the absence of solvents.

16 Claims, No Drawings

PROCESS FOR PREPARING POLYETHER POLYOLS

CROSS-REFERENCE TO RELATED APPLICATIONS

This application claims the benefit of priority under 35 U.S.C. §119 (a) to (g) to European Patent Application No. 13 156 343.9, filed Feb. 22, 2013.

BACKGROUND OF THE INVENTION

The present invention relates to a process for preparing polyether polyols by base-catalyzed addition of alkylene oxides (epoxides) onto starter compounds which are solid at room temperature and have Zerevitinov-active hydrogen atoms.

Polyether polyols based on high-functionality starter compounds solid at room temperature, for example sugars, oligo- and polysaccharides, sugar alcohols (for example mannitol or sorbitol) and pentaerythritol, are generally reacted with polyfunctional isocyanates to give polyurethanes. It is equally possible, through the use of such polyether polyols, to obtain formed or solid polyurethane materials. Specific demands on the mechanical properties of the material, flammability, through-curing characteristics of the reaction components or hydrophilicity or hydrophobicity of the material are generally addressed via the structure of the polyether polyol and therein, in turn, through the choice of starter compound(s) and the composition of the added alkylene oxides. The alkylene oxides can be metered in a mixture or individually in succession, i.e. blockwise. Particular emphasis should be given here to the use of ethylene oxide as a pure block or to the use of blocks with a high ethylene oxide content as well as those formed from higher alkylene oxides, for example propylene oxide, since it is possible thereby to obtain not just polyurethane materials with elevated hydrophilicity but also, if the ethylene oxide has been metered in as an end block, polyether polyols having an elevated proportion of primary end groups, which impart to the polyether polyol elevated reactivity to isocyanates.

Starter compounds solid at room temperature can easily be made amenable to alkylene oxide addition reactions by performing the alkylene oxide addition in the presence of solvents unreactive towards alkylene oxides, as described, for example, in U.S. Pat. No. 4,332,936. In general, however, for reasons of sustainability and product hygiene, the use of organic solvents is undesirable. In addition, it is necessary in this case to provide valuable reactor volume for the solvent.

It is also possible to use starter compounds liquid at room temperature (co-starters) and/or alkylene oxide addition products thereof as suspension aids for the solid starter compounds. If, in this case, the alkylene oxide addition products of starter compounds solid at room temperature are used, it is also possible in principle to obtain polyether polyols based exclusively on the high-melting starter compounds in solvent-free form. Such processes are described, for example, in FR-A 1285708 and U.S. Pat. No. 3,190,927. However, the end products frequently exhibit inadequate dissolution capacity for starter compounds solid at room temperature, and in this case too, as in the case of use of solvents, a corresponding reactor volume for the suspension medium is required.

If water is used as a suspension medium/solvent for the starter compounds solid under reaction conditions, the alkylene oxide addition reaction can be stopped at a suitable point and the excess water can be removed by distillation. Such procedures are described, for example, in DE-A 1443022 and U.S. Pat. No. 4,430,490, but give rise to end products having lower functionalities as a result of the partial reaction of the water used as a suspension medium and solvent in the alkylene oxide addition. In addition, the controllability of the reaction in these so-called water methods is less good than reactions using other co-starters. It is necessary either to clean the glycol-containing wastewater formed, or to adjust the glycol content thereof to a constant value on recycling into the process. Equally, the intermediate distillative removal of the unreacted water means additional expenditure of time and energy.

It would therefore be desirable to perform the alkylene oxide addition reaction with minimum presence of solvents unreactive towards alkylene oxides and of other suspension aids at the reaction temperatures typically employed for base-catalyzed alkylene oxide addition reactions of 70 to 180° C. However, in the preparation of blockwise polyether polyols having pure ethylene oxide blocks or those having a proportion of oxyethylene units of greater than or equal to 75% by weight, it is difficult, in the absence of solvents, to obtain clear and homogeneous end products from solid starter compounds.

Prior systems fail to offer a satisfactory solution to the problems outlined with starters solid at room temperature, especially in the case of blockwise polyether polyols having a total content of oxyethylene units between 5 and 85% by weight based on the mass of all oxyalkylene units.

It was therefore an object of the present invention to provide a process for preparing polyether polyols based on starter compounds solid at room temperature, the resulting polyether polyols being formed from blocks having a content of oxyethylene units of greater than or equal to 75% by weight. The use of solvents and any great amounts of co-starters liquid at room temperature should be avoided here, and the result should be that no turbidity or inhomogeneity occurs in the end products.

SUMMARY OF THE INVENTION

Surprisingly, the object was achieved by a process for preparing polyether polyols having n $E_n$ blocks each comprising at least 75% by weight of oxyethylene units, and m $A_m$ blocks being different from the $E_n$ blocks, where n and m are each natural numbers from 1 to 10 and at least one starter compound having at least one Zerevitinov-active hydrogen atom and a melting point of ≥40° C., comprising reacting the at least one starter compound with ethylene oxide and at least one further alkylene oxide compound in the presence of a catalyst, wherein the $E_n$ block(s) are metered in under the conditions of the following inequation:

$$\frac{T_n * x(cat) * t_n}{x_n(EO)} > 2.9 \quad \text{in } [°C. * h] \tag{1}$$

where
$T_n$ is defined as the mean reaction temperature in ° C. during the metered addition of the ethylene oxide for the $E_n$ block,
x(cat) is defined as the amount of catalyst used in mol,
$t_n$ is defined as the metering time for the ethylene oxide in the $E_n$ block in hours,
$x_n(EO)$ is defined as the amount of ethylene oxide metered in for the $E_n$ block in mol, and
n is as defined above, and wherein the total content of oxyethylene units in the polyether polyols, based on the total mass of all the alkylene oxides metered in, is from 5 to 85% by weight.

DETAILED DESCRIPTION OF THE PREFERRED EMBODIMENTS

The use of the word a in connection with countable parameters should be understood here and hereinafter to mean the number one only when this is evident from the context (for example through the wording "exactly one"). Otherwise, expressions such as "an epoxide", "a starter compound" etc. always refer to those embodiments in which two or more epoxides, two or more starter compounds etc. are used.

The process according to the invention enables reaction of starter compounds solid at room temperature with alkylene oxides to give polyether polyols, without any need for the use of solvents, co-starters or other suspension aids. This is advantageous both for economic reasons and process technology reasons, since additional processing and workup steps are not necessary, and such process is generally desirable for the development of renewable and resource-protective operations. The outcome enabled by the process according to the invention is that, without the use of solvents, clear and homogeneous alkylene oxide addition products based on starter compounds solid at room temperature are obtained, these being usable in various ways as components of polyurethane materials comprising polyisocyanates.

Starter compounds in the context of the invention are understood to mean compounds having at least one Zerevitinov-active hydrogen atom. Hydrogen bonded to N, O or S is referred to as a Zerevitinov-active hydrogen (or as "active hydrogen") when it gives methane by reaction with methylmagnesium iodide by a process discovered by Zerevitinov. Typical examples of compounds having Zerevitinov-active hydrogen are compounds containing carboxyl, hydroxyl, amino, imino or thiol groups as functional groups. Starter compounds solid at room temperature are understood to mean those starter compounds whose melting points are 40° C. or higher, and liquid starter compounds to mean those having melting points less than 40° C.

The invention is illustrated in detail hereinafter. Various embodiments can be combined here with one another as desired, unless the opposite is apparent to the person skilled in the art from the context.

Preferably in accordance with the invention. the starter compounds are starter compounds which are in solid form at ≤40° C. Examples thereof are mono-, oligo- and polysaccharide, pentaerythritol, dipentaerythritol, tripentaerythritol, trimethylolethane, trimethylolpropane, sorbitol, 1,12-dodecanediol, 1,2-decanediol, 1,10-decanediol, cyclic polyols (for example inositol), aromatic hydroxyl compounds (for example phenol, hydroquinone, catechol, resorcinol, 1,3,5-trihydroxybenzene, bisphenol A or bisphenol F), methylol-containing condensates of formaldehyde and phenol or melamine or urea, Mannich bases, high-functionality starter compounds based on hydrogenated starch hydrolysis products, polyamines (for example compounds based on high-functionality polycyclic aniline/formaldehyde condensation products ("polymeric MDA"), and isomers or isomer mixtures of tolylenediamine (especially 2,4-TDA, 2,6-TDA, 2,3-TDA, 3,4-TDA). It is also possible to use compounds having carboxylic acid groups (for example malonic acid, glutaric acid or adipic acid) or compounds having hydroxyl and carboxylic acid functions (for example the isomers of hydroxybenzoic acid, the isomers of hydroxymethylbenzoic acid, the isomers of dihydroxybenzoic acid, the isomers of trihydroxybenzoic acid, mandelic acid, malic acid, citric acid, tartaric acid and mucic acid). The starter compounds used are preferably pentaerythritol, sucrose, trimethylolpropane and/or sorbitol, with particular preference being given to using sorbitol.

The starter compounds for use in accordance with the invention can also be used as mixtures. Together with the solid starter compounds, it is possible in accordance with the invention also to use small amounts, up to 30% by weight, based on the total mass of all starter compounds, of those having melting points lower than 40° C. These starter compounds are, for example, methanol, ethanol, 1-propanol, 2-propanol, and higher aliphatic monools liquid at room temperature, 1,2-propylene glycol, 1,3-propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, glycerol and triethanolamine, and also water. According to the invention, at least 70% by weight of the starter compounds used have a melting point of ≥40° C., with preference being given to using exclusively one or more starter compounds having a melting point of ≥40° C.

In order to facilitate the handling of the starter compounds solid at room temperature which are to be used in accordance with the invention (for example for the deprotonation step in the case of reaction with a basic catalyst), the starter compounds can be used in the form of an aqueous solution and the reaction mixture can be dewatered, for example by means of a stripping step, before commencement of the actual alkylene oxide addition reaction or after interruption of an already running alkylene oxide addition reaction. In a preferred embodiment of the process according to the invention, no solvents are used in the reaction of the starter compound with ethylene oxide and the at least one further alkylene oxide compound.

A process according to the invention which does not require the use of solvents is to be understood in such a way, that usual reaction conditions are applied without any extra addition of solvents unreactive towards alkylene oxides and/or water. A solvent-free process therefore comprises the use of starter compounds and alkylene oxides, which, due to their manufacturing process, still may contain traces of solvents (≤5% by weight), especially up to 2% by weight of water, provided these are not intentionally admixed.

Alkylene oxides suitable for the process according to the invention are, as well as ethylene oxide, for example, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide and pinene oxide. Preference is given to using ethylene oxide (EO) and propylene oxide (PO) in the process according to the invention.

The polyether polyols prepared by the process according to the invention have a block structure having at least one $E_n$ block and at least one $A_m$ block. The $E_n$ block(s) which are to be metered in the process according to the invention and are rich in oxyethylene units, having a content of oxyethylene units of at least 75% by weight, can be metered in as internal blocks or as an end block. Preferably, the polyether polyols prepared by the process according to the invention have an $E_n$ block as the end block, since products having end blocks rich in oxyethylene units are characterized by an elevated proportion of primary end groups, which impart to the polyether polyols an elevated reactivity to isocyanates. Preferably, at least one $E_n$ block contains at least 90% by weight of oxyethylene units; more preferably, at least one $E_n$ block contains 100% by weight of oxyethylene units.

In a preferred embodiment of the invention, the polyether polyols prepared by the process according to the invention, aside from the structural units originating from the starters, consist exclusively of the $E_n$ and $A_m$ blocks. Preferably at least one $A_m$ block, and more preferably all $A_m$ blocks, comprise(s) not more than 40% by weight, preferably not more than 25% by weight of oxyethylene units.

The total content of oxyethylene units in the polyether polyols prepared by the process according to the invention is, based on the total mass of all the alkylene oxides metered in, from 5 to 85% by weight. Preferably, the polyether polyol prepared by the process according to the invention contains up to 60% by weight, more preferably up to 45% by weight and most preferably up to 30% by weight of oxyethylene units, based on the total mass of all the alkylene oxides metered in.

The polyether polyols prepared by a process according to the invention are therefore block copolymers comprising blocks with a high ethylene oxide content $E_n$ as well as blocks with a low ethylene oxide content $A_m$. In a preferred embodiment of the process according to the invention, propylene oxide is used exclusively in addition to ethylene oxide in the preparation of these block copolymers. Blocks $A_m$ with low ethylene oxide content are therefore preferably rich in oxypropylene units.

Changes in the block composition can be undertaken during the epoxide metering phase discontinuously or else continuously, within short periods.

In the process according to the invention, preference is given to using basic catalysts, for example alkali metal hydrides, alkali metal carboxylates (for example of monofunctional carboxylic acids), alkali metal hydroxides, alkali metal alkoxides (for example of monofunctional alcohols) or amines. An overview of amines suitable for the process according to the invention has been given by M. Ionescu et al. in "Advances in Urethanes Science and Technology", 1998, 14, p. 151-218. For example, it is possible to use N,N-dimethylbenzylamine, dimethylaminopropanol, N-methyldiethanolamine, trimethylamine, triethylamine, N,N-dimethylcyclohexylamine, N-methylpyrrolidine, N,N,N',N'-tetramethylethylenediamine, diazabicyclo[2.2.2]octane, 1,4-dimethylpiperazine, N-methylmorpholine, unsubstituted imidazole and/or alkyl-substituted imidazole derivatives. The basic catalysts used in the process according to the invention are more preferably alkali metal hydroxides (for example sodium hydroxide, potassium hydroxide or caesium hydroxide), alkali metal alkoxides of mono- or polyfunctional alcohols, imidazole or alkyl-substituted imidazole derivatives (for example N-methylimidazole). Very particular preference is given to using potassium hydroxide in the process according to the invention.

The alkali metal hydroxides can be supplied to the starter compounds solid at room temperature in solid form or as highly concentrated aqueous solutions. Water of dissolution and the water which arises through the reaction of the alkali metal hydroxides with the Zerevitinov-active hydrogen atoms in the starter compound can be removed by means of a stripping step upstream of the alkylene oxide metering phase. If, in the case of alkali metal hydroxide catalysis, aqueous solutions of starter compounds solid at room temperature are used, it is appropriate to perform only one stripping step, for example, before commencement of the actual alkylene oxide addition phase or, less preferably, after interruption of an already running alkylene oxide addition reaction.

It may turn out beneficial to adjust the amount of catalyst as defined by inequation (1) for the metering of one or more blocks $E_n$ not before the completion of dosing a first inner block $A_m$. Water brought into the process by such a step and/or water generated by the reaction of the alkali metal hydroxide with the Zerevitinov-active hydrogen atoms of the starter compound is then preferably being removed before resuming the alkylene oxide dosage.

The basic catalysts are used generally in amounts, based on the amount of end product, of 0.004 to 1.0% by weight, preferably 0.02 to 1.0% by weight, with fulfillment of the condition formulated in inequation (1) during the metered addition of the block(s) having a content of oxyethylene units of greater than or equal to 75% by weight.

In the process according to the invention, the at least one starter compound is reacted with ethylene oxide and at least one further alkylene oxide compound preferably at a temperature of 70 to 170° C., more preferably at a temperature of 100 to 160° C. The temperature can be varied within the above-described limits during the alkylene oxide metering phase, with maintenance of such an average reaction temperature $T_n$ over time during the metered addition of the $E_n$ block(s) that the condition formulated in inequation (1) is fulfilled.

In order to achieve an optimal balance between high alkylene oxide conversion and low by-product formation in the case of use of sensitive starter compounds (for example sucrose), it is possible to first alkoxylate at low reaction temperatures (for example at 70 to 110° C.), and only when starter conversion is sufficient (for example as soon as at least 50% by weight of the starter compounds used have reacted with alkylene oxide at least one Zerevitinov-active hydrogen atom) to move to higher reaction temperatures (for example to from 110 to 130° C.). Post-reactions can likewise be performed at higher temperatures (i.e. after raising the temperature to 100 to 170° C., preferably 100 to 150° C.). If long-chain polyether polyols, i.e. polyether polyols having equivalent molar masses greater than 500 Da, are prepared, it is advisable, in the case of attainment of high equivalent molar masses and in the case of metered addition of propylene oxide-containing blocks, for example at 500 Da or higher equivalent molar masses, to restrict the reaction temperature to values of 120° C., preferably 110° C. or less, in order to reduce to a tolerable degree the side reactions of the propylene oxide, especially the rearrangement thereof to allyl alcohol. The extent of this side reaction naturally increases with the content of propylene oxide in the alkylene oxide mixture metered in; therefore, the restriction in the reaction temperature is recommended when the propylene oxide content in the alkylene oxide mixture metered in exceeds values of 30% by weight, especially when it exceeds values of 50% by weight or even 70% by weight. The metered addition of blocks of high ethylene oxide content or of blocks of pure ethylene oxide, and also post-reactions, can in turn be performed at higher temperatures (i.e. after raising the temperature to 100 to 170° C., preferably 100 to 150° C.). It may be necessary to keep the temperature of the exothermic alkylene oxide addition reaction at the desired level by cooling. Such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers (Ullmann's Encyclopedia of Industrial Chemistry, volume B4, page 167ff., 5th edition, 1992). These should advantageously be designed such that effective cooling is possible even at the start of the metering phase, i.e. in the case of a low fill level, and in the presence of heterogeneous reactor contents (for example in the presence of solid dispersions).

The calculated OH numbers of the polyether polyols obtainable by the process according to the invention preferably have values of 28 mg KOH/g to 500 mg KOH/g, more preferably of 50 mg KOH/g to 400 mg KOH/g, most preferably of 80 mg KOH/g to 350 mg KOH/g.

The relationship of the OH number to the equivalent molar mass is represented in equation (2). The equivalent molar mass is understood to mean the number-average total molar mass of the material containing active hydrogen atoms divided by the number of active hydrogen atoms (functionality).

$$\text{OH number [mg KOH/g]} = 56\,100 \text{ [mg KOH/mol]} / \text{equivalent molar mass [g/mol]} \quad (2)$$

The reaction progress in the reaction of the at least one starter compound with ethylene oxide and at least one further alkylene oxide compound in the process according to the invention is associated with a decrease in the OH number, according to the relationship given in equation (2).

It has been found that, in spite of fulfillment of the condition formulated in inequation (1), polyether polyols with comparatively broad molar mass distributions are sometimes obtained. Polyether polyols with particularly narrow molar mass distributions, i.e. low polydispersities (PD), are obtained when, during the reaction of the at least one starter compound with ethylene oxide and at least one further alkylene oxide compound, the following inequation (3) applies:

$$T_a * x(\text{cat})/m_a < 12.5 \text{ in } [°\text{C.*mol/kg}] \quad (3)$$

with
  $T_a$ as the mean reaction temperature in ° C. during the reaction of the at least one starter compound,
  x(cat) as the amount of catalyst used in mol and
  $m_a$ as the mass of the mixture in kg on completion of conversion of the at least one starter compound.

The polydispersity (PD) is defined as the molecular weight distribution $M_w/M_n$ where $M_w$ is the weight-average molar mass and $M_n$ the number-average molar mass.

In a preferred embodiment of the invention, inequation (3) applies from an OH number of 1000 mg KOH/g or less, more preferably from 850 mg KOH/g or less. The lower limit in the OH number range for which inequation (3) applies is defined by the OH number of the polyether polyol on completion of conversion of the at least one starter compound. Preferably, inequation (3) applies up to an OH number of 215 mg KOH/g, where $m_a$ denotes the mass of the mixture in kg when the OH number of 215 mg KOH/g is passed.

Generally, good mixing of the reactor contents has to be ensured in all reaction phases through design and use of standard stirrer units, suitable stirrer units here being especially stirrers arranged over one or more levels or stirrer types which act over the full fill height (see, for example, Handbuch Apparate [Apparatus Handbook]; Vulkan-Verlag Essen, 1st ed. (1990), p. 188-208). Of particular technical relevance here is a volume-specific mixing power which is introduced on average over the entire reactor contents and is generally in the range from 0.2 W/l to 5 W/l, based on the reactor volume, with correspondingly higher volume-specific local power inputs in the region of the stirrer units themselves and possibly in the case of relatively low fill levels. In order to achieve optimal stirring action, a combination of baffles (for example flat or tubular baffles) and cooling coils (or cooling cartridges) may be arranged within the reactor, and these may also extend over the vessel base. The stirring power of the mixing unit may also be varied as a function of the fill level during the metering phase, in order to ensure a particularly high power input in critical reaction phases. For example, it may be advantageous to vigorously mix solids-containing dispersions which may be present at the start of the reaction in the case of (additional) use of sucrose, or viscous melts of starters solid at room temperature. Moreover, when solid starters are used, it has to be ensured through the selection of the stirrer unit that sufficient dispersion of the solids in the reaction mixture is assured. Stirrer levels passing close to the bottom and stirrer units particularly suitable for suspension are preferably used. In addition, the stirrer geometry should contribute to reducing the foaming of reaction products. The foaming of reaction mixtures can be observed, for example, after the end of the metering and post-reaction phase, when residual alkylene oxides are additionally removed under reduced pressure, at absolute pressures in the range from 1 mbar to 500 mbar. For such cases, suitable stirrer units have been found to be those which achieve continuous mixing of the liquid surface. According to the requirement, the stirrer shaft has a base bearing and optionally further support bearings in the vessel. The stirrer shaft can be driven from the top or bottom (with central or eccentric arrangement of the shaft).

Alternatively, it is also possible to achieve the necessary mixing exclusively by means of a pumped circulation system conducted through a heat exchanger, or to operate this pumped circulation system as a further mixing component in addition to the stirrer unit, in which case the reactor contents are pumped in circulation as required (typically 1 to 50 times per hour). The specific mixing energy introduced by means of pumped circulation, for example by means of any external heat exchanger or, in the case of recycling into the reactor, by means of a nozzle or injector, likewise amounts to values averaging from 0.2 to 5 W/l, this being based on the liquid volume present in the reactor and the pumped circulation system at the end of the reaction phase.

The alkylene oxides can be supplied to the reactor in different ways: One option is metered addition into the gas phase or directly into the liquid phase, for example, by means of an immersed tube or a distributor ring close to the reactor base in a zone with good mixing. The continuous metered addition of the at least one alkylene oxide is effected such that the safety-related pressure limits are not exceeded. These are naturally guided by the apparatus features in the particular case, the operation being executed generally within a pressure range from 1 mbar to 10 bar, more preferably from 1 mbar to 4 bar. Especially in the case of metered addition of ethylene oxide-containing alkylene oxide mixtures or pure ethylene oxide, it should advantageously be ensured that a sufficient partial inert gas pressure is maintained within the reactor during the startup and metering phase. This can be established, for example, by means of noble gases or nitrogen. In the case of metered addition into the liquid phase, the metering units should be designed such that they self-empty, for example through provision of metering holes on the underside of the distributor ring. Generally, apparatus measures, for example the installation of non-return valves, should prevent backflow of reaction medium into the metering units and reactant reservoirs. If an alkylene oxide mixture is being metered in, the respective alkylene oxides can be supplied to the reactor separately or as a mixture. Premixing of the alkylene oxides with one another can be achieved, for example, by means of a mixing unit present in the common mixing zone ("inline blending"). It has also been found to be useful to meter the alkylene oxides, on the pump pressure side, individually or in premixed form into a pumped circulation system conducted, for example, through one or more heat exchangers. In that case, for good mixing with the reaction medium, it is advantageous to integrate a high-shear mixing unit into the alkylene oxide/reaction medium stream.

Generally, a wide variety of different reactor types are suitable for the performance of the process according to the invention. In general, cylindrical vessels having a height to diameter ratio of 1:1 to 10:1 are used. Useful reactor bases include hemispherical, dished, flat or conical bases.

After metered addition of epoxide has ended, or in the event of a change in the composition of the alkylene oxide mixture metered in, there may follow post-reaction phases in which residual alkylene oxide is depleted. The end of such a post-reaction phase has been attained when no further pressure drop can be detected in the reaction tank. Traces of unreacted alkylene oxides, after the (post-)reaction phase, can optionally be removed quantitatively under reduced pressure, at an absolute pressure of 1 mbar to 500 mbar, or by stripping. Stripping removes volatile constituents, for example (residual) alkylene oxides, with introduction of inert gases or steam into the liquid phase with simultaneous application of reduced pressure, for example by passing inert gas through at an absolute pressure of 5 mbar to 500 mbar. The removal of volatile constituents, for example of unconverted alkylene oxides, either under reduced pressure or by stripping, is effected at temperatures of 20° C. to 200° C., preferably at 50° C. to 160° C., and preferably with stirring. The stripping operations can also be performed in what are called stripping columns, in which an inert gas or steam stream is passed counter to the product stream. Preference is given to performing the stripping operation with inert gases in the absence of steam.

After attainment of constant pressure or after removal of volatile constituents under reduced pressure and/or stripping, the product can optionally be subjected to workup steps, in order to remove any catalyst traces. In the case of alkylene oxide addition reactions catalyzed with amines, such after treatment steps are generally not required. The optional removal of the catalyst from the crude product can be effected in various ways: For example, the basic catalyst can be neutralized with dilute mineral acids such as sulphuric acid or phosphoric acid. The salts formed in the course of neutralization are removed, for example by filtration. Exceptions are the polyether polyol preparation processes described in EP-A 2028211, WO-A 2009/152954, WO-A 2011/039145 and WO-A 2009/106244, which include workup processes without salt removal steps. Alternatively, the neutralization can be effected with hydroxycarboxylic acids (for example lactic acid, as described in WO-A 98/20061 and US-A 2004/167316). Equally suitable for neutralization are carboxylic acids, for example formic acid, as described in U.S. Pat. No. 4,521,548. The metal carboxylates formed by the neutralization with carboxylic acids (for example hydroxycarboxylic acids or formic acid) are soluble in the polyether polyol to give a clear solution, and so the removal of the salts can be dispensed with here. It is likewise possible to remove the catalyst by using acidic cation exchangers, as described, for example, in DE-A 100 24 313. In addition, the catalysts can be removed by means of adsorbents, for example sheet silicates (bentonite, attapulgite), diatomaceous earth, or else with the aid of synthetic magnesium silicates (such as AMBOSOL® or BriteSorb®). Such purification processes are described in RO 118433, U.S. Pat. No. 4,507,475, EP-A 0693513 and EP-A 1751213. Phase separation processes, which may be promoted by hydrophobic solvents, are likewise possible in principle, but the water solubility of the polyether polyol containing oxyethylene units prepared on the basis of the starter compounds solid at room temperature can be too high for the effective performance of phase separation processes. Phase separation processes are described, for example, in WO-A 01/14456, JP-A 6-157743, WO-A 96/20972 and U.S. Pat. No. 3,823,145.

It has been found to be advantageous to always handle polyols under inert gas atmosphere. This is especially true of alkaline polyether polyols as obtained, for example, under alkali metal hydroxide catalysis prior to removal of the catalyst, or of products obtained under amine catalysis. For salt-free, worked-up and stabilized finished products too, or polyether polyols prepared by means of double metal cyanide catalysis (DMC catalysis), handling and storage with exclusion of oxygen are recommended. Inert gases suitable for this purpose are, for example, noble gases, nitrogen or carbon dioxide; noble gases or nitrogen are particularly suitable. The prevention of ingress of oxygen very substantially prevents product discoloration; this is especially true at elevated temperatures, which are generally utilized in order to facilitate the handling of the polyether polyols through lowering of the product viscosity. Furthermore, under an inert gas atmosphere, a much lower level of peroxide groups also arises, these contributing, with cleavage of the polyether chains, to formation of further low molecular weight oxidative degradation products, for example acetaldehyde, methanol, formic acid, formic esters, acetone and formaldehyde. Thus, the content of volatile organic compounds in the polyether polyols can be lowered, and odor nuisance, damage to health and inferior quality can be avoided. It is optionally possible to add ageing stabilizers, for example antioxidants, to the polyether polyols prepared by the process according to the invention. The process according to the invention can be used to prepare polyether polyols which at 20° C. are, in particular, visually clear and/or homogeneous.

The polyether polyols prepared by the process according to the invention can be used as starting components for the production of solid or foamed polyurethane materials and of polyurethane elastomers. The polyurethane materials and elastomers may also contain isocyanurate, allophanate and biuret structural units. It is likewise possible to prepare what are called isocyanate prepolymers, the preparation of which involves using at least one (poly)isocyanate and at least one polyether polyol obtainable by the process according to the invention, the molar ratio of isocyanate groups to hydroxyl groups being greater than 1, such that the resulting prepolymers contain isocyanate groups. The isocyanate groups in the prepolymers can be reacted in one or more steps with compounds containing Zerevitinov-active hydrogen atoms for production of the actual end products, for example solid or foamed polyurethane materials or polyurethane elastomers. Conversely, it is also possible to react (poly)isocyanates and at least one polyether polyol obtainable by the process according to the invention in such a way that the molar ratio of isocyanate groups to hydroxyl groups is less than 1, and hence the resulting prepolymers contain hydroxyl groups. The hydroxyl groups in the prepolymers can be reacted in one or more steps with isocyanate-containing compounds for production of the actual end products, for example solid or foamed polyurethane materials or polyurethane elastomers.

For production of solid or foamed polyurethane materials and of polyurethane elastomers, at least one polyether polyol obtainable by the process according to the invention is optionally mixed with further isocyanate-reactive components and reacted with organic polyisocyanates, optionally in the presence of blowing agents, catalysts and/or other additives, for example cell stabilizers.

Examples

Raw Materials Used

IRGANOX® 1076:
Octadecyl 3-(3,5-di-tert-butyl-4-hydroxyphenyl)propionate (Ciba Specialty Chemicals (now BASF))
Test and Determination Methods:
OH Number and Viscosity The OH numbers were determined by the method of DIN 53240. The viscosities were found by means of a rotary viscometer (Physica MCR 51, manufacturer: Anton Paar) by the method of DIN 53019 (CC27 spindle type, shear rate range 16-128 $s^{-1}$).

Molar Mass Distribution

The molar mass distributions were determined by means of size exclusion chromatography (SEC). The Agilent 1100 Series from Agilent was used. The polydispersity (PD) is reported for the molecular weight distribution $M_w/M_n$ where $M_w$ is the weight-average molar mass and $M_n$ the number-average molar mass. Further details:

Column combination: 1 PSS pre-column, 5 µl, 8×50 mm; 2 PSS SVD, 5 µl, 100 A°, 8×300 mm; 2 PSS SVD, 5 µl, 1000 A°, 8×300 mm, PSS is the manufacturer of the columns (Polymer Standard Service, Mainz)
Evaluation software: WinGPC from PSS
Solvent: THF (Merck LiChrosolv®)
Flow rate: 1 ml/min
Detector type: RI detector (refractive index), Shodex RI-74
Calibration standards used: calibration standard from PSS based on polystyrene.

Example 1

A 2 liter laboratory autoclave under a nitrogen atmosphere was charged with 163.5 g of an aqueous sorbitol solution containing 70% by weight of sorbitol, and 10.797 g of aqueous KOH solution containing 44.78% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 130° C. and 875.5 g of propylene oxide were metered into the headspace of the autoclave at a stirrer speed of 800 rpm over a period of 3.07 h; the metered addition was commenced at an absolute pressure of 0.05 bar. The end of metered addition of propylene oxide was followed by a post-reaction period of 1.43 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 218.9 g of ethylene oxide ("oxyethylene unit-rich block") was likewise metered into the headspace of the autoclave at 130° C. over a period of 3.2 h. After a post-reaction period of 3.68 h, the product was devolatilized by heating under reduced pressure (10 mbar) over a period of 30 min. After cooling to 80° C., 120 ml of distilled water and 35.23 g of a 12.22% by weight aqueous sulphuric acid solution were added, and the mixture was stirred at 80° C. over a period of 30 min. The mixture formed was discharged into a glass flask, and 2.1093 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 182 mg KOH/g and a viscosity of 808 mPas (at 25° C.) was obtained. The polydispersity was 1.09.

Example 2

A 2 liter laboratory autoclave under a nitrogen atmosphere was charged with 163.0 g of an aqueous sorbitol solution containing 70% by weight of sorbitol, and 5.380 g of aqueous KOH solution containing 44.76% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 872.8 g of propylene oxide were metered into the headspace of the autoclave at a stirrer speed of 800 rpm over a period of 3.07 h; the metered addition was commenced at an absolute pressure of 0.05 bar. The end of metered addition of propylene oxide was followed by a post-reaction period of 0.67 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 218.2 g of ethylene oxide ("oxyethylene unit-rich block") was likewise metered into the headspace of the autoclave at 150° C. over a period of 3.2 h. After a post-reaction period of 3.11 h, the product was devolatilized by heating under reduced pressure (10 mbar) over a period of 30 min. After cooling to 80° C., 120 ml of distilled water and 17.40 g of a 12.22% by weight aqueous sulphuric acid solution were added, and the mixture was stirred at 80° C. over a period of 30 min. The mixture formed was discharged into a glass flask, and 2.1038 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 172 mg KOH/g and a viscosity of 843 mPas (at 25° C.) was obtained. The polydispersity was 1.03.

Example 3

A 2 liter laboratory autoclave under a nitrogen atmosphere was charged with 163.1 g of an aqueous sorbitol solution containing 70% by weight of sorbitol, and 10.850 g of aqueous KOH solution containing 44.76% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 120 g of propylene oxide were metered into the autoclave at a stirrer speed of 800 rpm; the metered addition was commenced at an absolute pressure of 0.05 bar. The contents of the autoclave were then cooled to 120° C. At 120° C., a further 749 g of propylene oxide were added. The entire amount of propylene oxide was added over a period of 3.88 h. After the metered addition of propylene oxide had ended, the mixture was heated again to 150° C. and there followed a post-reaction period of 1 h. The OH number of the reactor contents at this time, calculated on the basis of the OH number of the starter compound, and the molar amounts of starter compound, catalyst and propylene oxide, was 214 mg KOH/g. The reactor pressure was then adjusted by means of nitrogen to 2.75 bar and a total of 217.3 g of ethylene oxide ("oxyethylene unit-rich block") was likewise metered into the headspace of the autoclave at 150° C. over a period of 3.15 h. After a post-reaction period of 0.55 h, the product was devolatilized by heating under reduced pressure (10 mbar) over a period of 30 min. After cooling to 80° C., 120 ml of distilled water and 17.40 g of a 12.22% by weight aqueous sulphuric acid solution were added, and the mixture was stirred at 80° C. over a period of 30 min. The mixture formed was discharged into a glass flask, and 2.1038 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 171 mg KOH/g and a viscosity of 847 mPas (at 25° C.) was obtained. The polydispersity was 1.03.

Example 4

A 2 liter laboratory autoclave under a nitrogen atmosphere was charged with 163.7 g of an aqueous sorbitol solution containing 70% by weight of sorbitol, and 5.449 g of aqueous KOH solution containing 44.76% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 120 g of propylene oxide were metered into the autoclave at a stirrer speed of 800 rpm; the metered addition was commenced at an absolute pressure of 0.05 bar. The contents of the autoclave were then cooled to 120° C. At 120° C., a further 753 g of propylene oxide were added. The entire amount of propylene oxide was added over a period of 5.6 h. After the metered addition of propylene oxide had ended, the mixture was heated again to 150° C. and there followed a post-reaction period of 2.17 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 219.2 g of ethylene oxide ("oxyethylene unit-rich block") was likewise metered into the headspace of the autoclave at 150° C. over a period of 3.23 h. After a post-reaction period of 1.05 h, the product was devolatilized by heating under reduced pressure (10 mbar) over a period of 30 min. After cooling to 80° C., 120 ml of distilled water and 17.58 g of a 12.22% by weight aqueous sulphuric acid solution were added, and the mixture was stirred at 80° C. over a period of 30 min. The mixture formed was discharged into a glass flask, and 2.100 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 171 mg KOH/g and a viscosity of 836 mPas (at 25° C.) was obtained. The polydispersity was 1.03.

Example 5

A 2 liter laboratory autoclave under a nitrogen atmosphere was charged with 162.9 g of an aqueous sorbitol solution containing 70% by weight of sorbitol, and 10.790 g of aqueous KOH solution containing 44.76% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 872.6 g of propylene oxide were metered into the headspace of the autoclave at a stirrer speed of 800 rpm over a period of 2.38 h; the metered addition was commenced at an absolute pressure of 0.05 bar. The end of metered addition of propylene oxide was followed by a post-reaction period of 0.83 h. The OH number of the reactor contents at this, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 218.1 g of ethylene oxide ("oxyethylene unit-rich block") was likewise metered into the headspace of the autoclave at 150° C. over a period of 3.22 h. After a post-reaction period of 0.67 h, the product was devolatilized by heating under reduced pressure (10 mbar) over a period of 30 min. After cooling to 80° C., 120 ml of distilled water and 35.22 g of a 12.22% by weight aqueous sulphuric acid solution were added, and the mixture was stirred at 80° C. over a period of 30 min. The mixture formed was discharged into a glass flask, and 2.0969 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 182 mg KOH/g and a viscosity of 773 mPas (at 25° C.) was obtained. The polydispersity was 1.18.

Example 6

A 2 liter laboratory autoclave under a nitrogen atmosphere was charged with 163.1 g of an aqueous sorbitol solution containing 70% by weight of sorbitol, and 22.022 g of aqueous KOH solution containing 44.76% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 873.4 g of propylene oxide were metered into the headspace of the autoclave at a stirrer speed of 800 rpm over a period of 3.50 h; the metered addition was commenced at an absolute pressure of 0.05 bar. The end of metered addition of propylene oxide was followed by a post-reaction period of 0.58 h. The OH number of the reactor contents at this time, calculated on the basis of the OH number of the starter compound, and the molar amounts of starter compound, catalyst and propylene oxide, was 212 mg KOH/g. The reactor pressure was then adjusted by means of nitrogen to 2.75 bar and a total of 218.4 g of ethylene oxide ("oxyethylene unit-rich block") was likewise metered into the headspace of the autoclave at 150° C. over a period of 1.12 h. After a post-reaction period of 0.17 h, the product was devolatilized by heating under reduced pressure (10 mbar) over a period of 30 min. After cooling to 80° C., 120 ml of distilled water and 70.50 g of a 12.22% by weight aqueous sulphuric acid solution were added, and the mixture was stirred at 80° C. over a period of 30 min. The mixture formed was discharged into a glass flask, and 2.0978 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 181 mg KOH/g and a viscosity of 773 mPas (at 25° C.) was obtained. The polydispersity was 1.15.

Example 7

A 2 liter laboratory autoclave under a nitrogen atmosphere was charged with 92.9 g of an aqueous sorbitol solution containing 70% by weight of sorbitol, and 2.985 g of aqueous KOH solution containing 44.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 908.3 g of propylene oxide were metered into the headspace of the autoclave at a stirrer speed of 800 rpm over a period of 5.7 h; the metered addition was commenced at an absolute pressure of 0.05 bar. The end of metered addition of propylene oxide was followed by a post-reaction period of 3.0 h. The OH number of the reactor contents at this time, calculated on the basis of the OH number of the starter compound, and the molar amounts of starter compound, catalyst and propylene oxide, was 123 mg KOH/g. The reactor pressure was then adjusted by means of nitrogen to 2.75 bar and a total of 227.0 g of ethylene oxide ("oxyethylene unit-rich block") was likewise metered into the headspace of the autoclave at 150° C. over a period of 6.08 h. After a post-reaction period of 0.87 h, the product was devolatilized by heating under reduced pressure (10 mbar) over a period of 30 min. After cooling to 80° C., 120 ml of distilled water and 10.356 g of a 11.74% by weight aqueous sulphuric acid solution were added, and the mixture was stirred at 80° C. over a period of 30 min. The mixture formed was discharged into a glass flask, and 0.6008 g of IRGANOX® 1076 was added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 104 mg KOH/g and a viscosity of 656 mPas (at 25° C.) was obtained. The polydispersity was 1.03.

Example 8

A 2 liter laboratory autoclave under a nitrogen atmosphere was charged with 279.1 g of an aqueous sorbitol solution containing 70% by weight of sorbitol, and 8.552 g of aqueous KOH solution containing 46.59% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 804.4 g of propylene oxide were metered into the headspace of the autoclave at a stirrer speed of 800 rpm over a period of 4.1 h; the metered addition was commenced at an absolute pressure of 0.05 bar. The end of metered addition of propylene oxide was followed by a post-reaction period of 1.2 h. The reactor pressure was then adjusted by means of nitrogen to 2.75 bar and a total of 201.0 g of ethylene oxide ("oxyethylene unit-rich block") was likewise metered into the headspace of the autoclave at 150° C. over a period of 1.83 h. After a post-reaction period of 0.93 h, the product was devolatilized by heating under reduced pressure (10 mbar) over a period of 30 min. After cooling to 80° C., 120 ml of distilled water and 30.405 g of an 11.74% by weight aqueous sulphuric acid solution were added, and the mixture was stirred at 80° C. over a period of 30 min. The mixture formed was discharged into a glass flask, and 0.600 g of IRGANOX® 1076 was added. Thereafter, the product was dewatered at 18 mbar (water-jet vacuum) for 1 h and then at 110° C. and 1 mbar over a period of 3 h. After filtration through a depth filter (T 750, from Seitz), a clear product with an OH number of 290 mg KOH/g and a viscosity of 2470 mPas (at 25° C.) was obtained. The polydispersity was 1.03.

Example 9

Comparative

A 2 liter laboratory autoclave under a nitrogen atmosphere was charged with 163.8 g of an aqueous sorbitol solution containing 70% by weight of sorbitol, and 10.948 g of aqueous KOH solution containing 44.78% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 120° C. and 877.1 g of propylene oxide were metered into the headspace of the autoclave at a stirrer speed of 800 rpm over a period of 11.6 h; the metered addition was commenced at an absolute pressure of 0.05 bar. The end of metered addition of propylene oxide was followed by a post-reaction period of 1.0 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 219.3 g of ethylene oxide ("oxyethylene unit-rich block") was likewise metered into the headspace of the autoclave at 120° C. over a period of 1.3 h. After a post-reaction period of 1.0 h, the product was devolatilized by heating under reduced pressure (10 mbar) over a period of 30 min. After cooling to 80° C., 120 ml of distilled water and 36.156 g of a 12.13% by weight aqueous sulphuric acid solution were added, and the mixture was stirred at 80° C. over a period of 30 min. The mixture formed was discharged into a glass flask, and 1.9725 g of IRGANOX® 1076 was added. Thereafter, the product was dewatered at 18 mbar (water-jet vacuum) for 1 h and then at 110° C. and 1 mbar over a period of 3 h. After filtration through a depth filter (T 750, from Seitz), a turbid product with an OH number of 162 mg KOH/g was obtained. The material solidified at room temperature to become a solid waxy substance. The polydispersity was 1.10.

Example 10

Comparative

A 2 liter laboratory autoclave under a nitrogen atmosphere was charged with 162.8 g of an aqueous sorbitol solution containing 70% by weight of sorbitol, and 10.775 g of aqueous KOH solution containing 44.78% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 120° C. and 869.1 g of propylene oxide were metered into the headspace of the autoclave at a stirrer speed of 800 rpm over a period of 7.9 h; the metered addition was commenced at an absolute pressure of 0.05 bar. The end of metered addition of propylene oxide was followed by a post-reaction period of 3.85 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 217.3 g of ethylene oxide ("oxyethylene unit-rich block") was likewise metered into the headspace of the autoclave at 120° C. over a period of 0.63 h. After a post-reaction period of 1.18 h, the product was devolatilized by heating under reduced pressure (10 mbar) over a period of 30 min. After cooling to 80° C., 120 ml of distilled water and 34.824 g of a 12.13% by weight aqueous sulphuric acid solution were added, and the mixture was stirred at 80° C. over a period of 30 min. The mixture formed was discharged into a glass flask, and 2.3614 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a product which was initially clear but rapidly became turbid, with an OH number of 164 mg KOH/g and a viscosity of 1700 mPas (at 25° C.), was obtained. The polydispersity was 1.04.

Example 11

Comparative

A 2 liter laboratory autoclave under a nitrogen atmosphere was charged with 162.8 g of an aqueous sorbitol solution containing 70% by weight of sorbitol, and 10.829 g of aqueous KOH solution containing 44.78% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 130° C. and 872.0 g of propylene oxide were metered into the headspace of the autoclave at a stirrer speed of 800 rpm over a period of 5.2 h; the metered addition was commenced at an absolute pressure of 0.05 bar. The end of metered addition of propylene oxide was followed by a post-reaction period of 2.37 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 218.0 g of ethylene oxide ("oxyethylene unit-rich block") was likewise metered into the headspace of the autoclave at 130° C. over a period of 0.8 h. After a post-reaction period of 0.58 h, the product was devolatilized by heating under reduced pressure (10 mbar) over a period of 30 min. After cooling to 80° C., 120 ml of distilled water and 35.635 g of a 12.13% by weight aqueous sulphuric acid solution were added, and the mixture was stirred at 80° C. over a period of 30 min. The mixture formed was discharged into a glass flask, and 2.0037 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a product which was initially clear but rapidly became turbid and later solidified to give a waxy solid, with an OH number of 167 mg KOH/g, was obtained. The polydispersity was 1.03.

Example 12

Comparative

A 2 liter laboratory autoclave under a nitrogen atmosphere was charged with 162.5 g of an aqueous sorbitol solution containing 70% by weight of sorbitol, and 10.762 g of aqueous KOH solution containing 44.78% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 150° C. and 869.1 g of propylene oxide were metered into the headspace of the autoclave at a stirrer speed of 800 rpm over a period of 3.18 h; the metered addition was commenced at an absolute pressure of 0.05 bar. The end of metered addition of propylene oxide was followed by a post-reaction period of 0.63 h. The OH number of the reactor contents at this time, calculated on the basis of the OH number of the starter compound, and the molar amounts of starter compound, catalyst and propylene oxide, was 213 mg KOH/g. The reactor pressure was then adjusted by means of nitrogen to 2.75 bar and a total of 217.3 g of ethylene oxide ("oxyethylene unit-rich block") was likewise metered into the headspace of the autoclave at 150° C. over a period of 0.92 h. After a post-reaction period of 0.55 h, the product was devolatilized by heating under reduced pressure (10 mbar) over a period of 30 min. After cooling to 80° C., 120 ml of distilled water and 34.670 g of a 12.13% by weight aqueous sulphuric acid solution were added, and the mixture was stirred at 80° C. over a period of 30 min. The mixture formed was discharged into a glass flask, and 2.0677 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a product which was initially clear but became slightly turbid later, with an OH number of 169 mg KOH/g and a viscosity of 840 mPas (at 25° C.), was obtained. The polydispersity was 1.10.

Example 13

Comparative

A 2 liter laboratory autoclave under a nitrogen atmosphere was charged with 115.4 g of glycerol and 10.574 g of aqueous KOH solution containing 46.49% by weight of KOH. The contents of the autoclave were then dewatered at 115° C. while stirring (cross-beam stirrer, 200 rpm) and with reduced pressure applied, with simultaneous introduction of 50 ml of nitrogen per minute over a period of 3 h. In the course of this, towards the end of the dewatering period, a pressure of 100-120 mbar was established. The mixture was heated to 120° C. and 871.6 g of propylene oxide were metered into the headspace of the autoclave at a stirrer speed of 800 rpm over a period of 4.27 h; the metered addition was commenced at an absolute pressure of 0.05 bar. The end of metered addition of propylene oxide was followed by a post-reaction period of duration 1.53 h. The OH number of the reactor contents at this time, calculated on the basis of the OH number of the starter, the amount of starter, the amount of catalyst and the amount of propylene oxide metered in, was 213 mg KOH/g. The reactor pressure was then adjusted by means of nitrogen to 2.75 bar and a total of 218.2 g of ethylene oxide ("oxyethylene unit-rich block") was likewise metered into the headspace of the autoclave at 120° C. over a period of 1.18 h. After a post-reaction period of duration 1.03 h, the product was devolatilized by heating under reduced pressure (10 mbar) over a period of 120 min. After cooling to 80° C., 120 ml of distilled water and 35.458 g of a 12.114% by weight aqueous sulphuric acid solution were added, and the mixture was stirred at 80° C. over a period of 60 min. The mixture formed was discharged into a glass flask, and 2.0287 g of IRGANOX® 1076 were added. Thereafter, the product was dewatered at 18 mbar (water-jet vacuum) for 1 h and then at 110° C. and 1 mbar over a period of 3 h. After filtration through a depth filter (T 750, from Seitz), a clear, storage-stable product with an OH number of 176 mg KOH/g was obtained.

In this comparative example, the critical parameters according to inequation (1) were set in accordance with the values for Comparative Example 9, except that a starter liquid at room temperature (glycerol) was used.

The test results are presented in Table 1 and Table 2:

comprising reacting the at least one starter compound with ethylene oxide and at least one further alkylene oxide compound in the presence of a catalyst, wherein the En block(s) are metered in under the conditions of the following inequation;

$$\frac{T_n * x(cat) * t_n}{x_n(EO)} > 2.9 \text{ in } [°C. * h] \quad (1)$$

where $T_n$ is defined as the man reaction temperature in ° C. during the metered addition of the ethylene oxide for the $E_n$ block, x(cat) is defined as the amount of catalyst used in mol, $t_n$ is defined as the metering time for the ethylene oxide in the $E_n$ block in hours, $x_n$(EO) is defined as the amount of ethylene oxide metered in for the $E_n$ block in mol, and

TABLE 1

| Example | $x_n$(EO) [mol] | x(CAT) [mol] | $t_n$ [h] | $T_n$ [° C.] | $T_a$ [° C.] | OH number of product [mg KOH/g] | Viscosity at 25° C. [mPas] | Polydispersity | Appearance |
|---|---|---|---|---|---|---|---|---|---|
| 1 | 4.969 | 0.086 | 3.2 | 130 | 130 | 182 | 808 | 1.09 | clear |
| 2 | 4.953 | 0.043 | 3.2 | 150 | 150 | 172 | 843 | 1.03 | clear |
| 3 | 4.933 | 0.087 | 3.2 | 150 | 120 | 171 | 847 | 1.03 | clear |
| 4 | 4.976 | 0.043 | 3.2 | 150 | 120 | 171 | 836 | 1.03 | clear |
| 5 | 4.951 | 0.086 | 3.2 | 150 | 150 | 182 | 773 | 1.18 | clear |
| 6 | 4.958 | 0.176 | 1.1 | 150 | 150 | 181 | 773 | 1.15 | clear |
| 7 | 5.153 | 0.024 | 6.1 | 150 | 150 | 104 | 656 | 1.03 | clear |
| 8 | 4.563 | 0.071 | 1.8 | 150 | 150# | 290 | 2470 | 1.03 | clear |
| 9## | 4.978 | 0.087 | 1.3 | 120 | 120 | 162 | not determinable | 1.10 | solid |
| 10## | 4.933 | 0.086 | 0.63 | 120 | 120 | 164 | 1700 | 1.04 | turbid |
| 11## | 4.949 | 0.086 | 0.80 | 130 | 130 | 167 | not determinable | 1.03 | solid |
| 12## | 4.933 | 0.086 | 0.92 | 150 | 150 | 169 | 840 | 1.10 | turbid |
| 13## | 4.953 | 0.088 | 1.2 | 120 | 120 | 176 | 250 | 1.05 | clear | reaction temperature up to attainment of the target OH number of the polyether polyol
Comparative Examples

TABLE 2

| Example | $(T_n * x(cat) * t_n)/x_n(EO)$ [° C. * h] | $(T_a * x(cat)/m_a$ [° C. * mol/kg]# |
|---|---|---|
| 1 | 7.2 | 11.4 |
| 2 | 4.2 | 6.6 |
| 3 | 8.3 | 10.6 |
| 4 | 4.2 | 5.3 |
| 5 | 8.4 | 13.2 |
| 6 | 6.0 | 26.9 |
| 7 | 4.2 | 6.4 |
| 8 | 4.3 | 8.6## |
| 9 (comparative) | 2.7 | 10.6 |
| 10 (comparative) | 1.3 | 10.5 |
| 11 (comparative) | 1.8 | 11.5 |
| 12 (comparative) | 2.4 | 13.2 |
| 13 (comparative) | 2.5 | 6.5 | passing through the OH number range from 850 to 215 mg KOH/g
passing through the OH number range from 850 mg KOH/g up to the target OH number of the polyether polyol

The invention claimed is:

1. Process for preparing polyether polyols having n En blocks each comprising at least 75% by weight of oxyethylene units, and m Am blocks being different from the En blocks, where n and m are each natural numbers from 1 to 10 and at least one starter compound having at least one Zerevitinov-active hydrogen atom and a melting point of ≥40° C., n is as defined above, and wherein the total content of oxyethylene units in the polyether polyols, based on the total mass of all the alkylene oxides metered in, is from 5 to 85% by weight.

2. Process according to claim 1, wherein the OH number during the reaction of the at least one starter compound with ethylene oxide and at least one further alkylene oxide compound decreases and the following inequation (3) applies:

$$T_a * x(cat)/m_a < 12.5 \text{ in } [°\text{C.*mol/kg}] \quad (3)$$

with $T_a$ as the mean reaction temperature in ° C. during the reaction of the at least one starter compound, x(cat) as the amount of catalyst used in mol and $m_a$ as the mass of the mixture in kg on completion of conversion of the at least one starter compound, where the inequation (3) applies from an OH number of 1000 mg KOH/g or less.

3. Process according to claim 1, wherein the OH number during the reaction of the at least one starter compound with ethylene oxide and at least one further alkylene oxide compound decreases and the following inequation (3) applies up to an OH number of 215 mg KOH/g:

$$T_a * \frac{x(cat)}{m_{a215}} < 12.5 \text{ in}[°\text{C.} * \text{mol/kg}] \quad (3)$$

with $T_a$ as the mean reaction temperature in ° C. during the reaction of the at least one starter compound, x(cat) as the amount of catalyst used in mol, and $m_{a215}$ denotes the mass of the mixture in kg when the OH number of 215 mg KOH/g is passed.

4. Process according to claim 1, wherein the OH numbers of the polyether polyols are from 28 mg KOH/g to 500 mg KOH/g.

5. Process according to claim 1, wherein the polyether polyols consist exclusively of the $E_n$ and $A_m$ blocks and the structural units originating from the starter compound.

6. Process according to claim 1, wherein at least one $A_m$ block comprises not more than 25% by weight of oxyethylene units.

7. Process according to claim 1, wherein the polyether polyols contain up to 45% by weight of oxyethylene units, based on the total mass of all the alkylene oxides metered in.

8. Process according to claim 1, wherein at least one further starter compound having a melting point <40° C. is used in a proportion of up to 30% by weight based on the total mass of all starter compounds.

9. Process according to claim 1, wherein no solvents are used in the reaction of the starter compound with ethylene oxide and the at least one further alkylene oxide compound.

10. Process according to claim 1, wherein the catalyst is a base.

11. Process according to claim 1, wherein at least one $E_n$ block contains at least 90% by weight of oxyethylene units.

12. Process according to claim 1, wherein one $E_n$ block is an end block.

13. Process according to claim 1, wherein the at least one starter compound is reacted with ethylene oxide and at least one further alkylene oxide compound at a temperature of 70 to 170° C.

14. Process according to claim 1, wherein the starter compound is selected from the group consisting of pentaerythritol, sucrose, trimethylolpropane, sorbitol and mixtures thereof.

15. Process according to claim wherein the alkylene oxides used are ethylene oxide and propylene oxide.

16. Process according to claim 1, wherein the catalyst is used in a concentration, based on the amount of end product, of 0.004 to 1.0% by weight.

* * * * *